United States Patent Office 2,984,678
Patented May 16, 1961

2,984,678

14α-HYDROXY HYDROCORTISONE, CORTISONE AND DERIVATIVES

Eugene J. Agnello, Barry M. Bloom, and Gerald D. Laubach, Jackson Heights, N.Y., assignors to Chas. Pfizer & Co., Inc., New York, N.Y., a corporation of Delaware No Drawing. Filed Dec. 11, 1956, Ser. No. 627,559

4 Claims. (Cl. 260—397.45)

This invention is concerned with certain novel steroid compounds, and with novel methods of preparing them. In particular it is concerned with steroid compounds having the formula

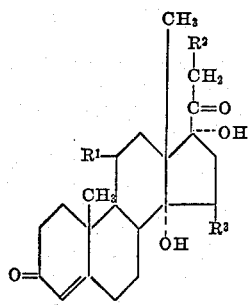

wherein $R^1$ is selected from the group consisting β-hydroxyl and keto, $R^2$ is selected from the group consisting of hydrogen, hydroxyl and esters and ethers thereof containing from one to ten carbon atoms in the added moiety, and $R^3$ is selected from the group consisting of hydroxyl and halogens. Of course when $R^1$ is β-hydroxyl, there will also be a hydrogen atom on the 11 position carbon atom. This application is in part a continuation of our copending application Serial No. 432,621, filed May 26, 1954, and now abandoned.

The starting materials for these syntheses are compounds having the formula

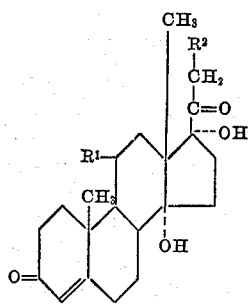

wherein $R^1$ and $R^2$ have the same meaning as above. These compounds are obtained by methods disclosed in U.S. Patent 2,702,812 and in the presently pending applications Serial Number 415,972, filed on March 12, 1954, now U.S. Patent 2,783,255 and Serial Number 432,314, filed May 25, 1954, now U.S. Patent 2,788,354.

These syntheses involve the steps outlined below. The starting compounds are first treated with a non-oxidizing strong acid in the presence of an organic solvent, the system p-toluenesulfonic acid in benzene for example. This results in the removal of the OH group at the 14 position and the introduction of a double bond at the 14 position to give compounds having the formula

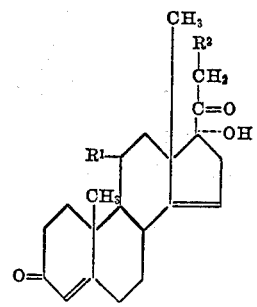

The term "strong acid" is used to describe a substance which, when dissolved in water, ionizes to at least as great an extent as does acetic acid, and which yields hydrogen ions. A substance is non-oxidizing when none of the atoms of the substance undergoes a decrease in valence during the reaction. Other useful non-oxidizing strong acids include, for example, hydrochloric acid and oxalic acid. Various solvents may be used in place of benzene. Those that have some value for this purpose include toluene, chloroform, carbontetrachloride, cyclohexane and dioxane.

The $\Delta^{14}$ compounds obtained in this way are then treated with an oxidizing agent. Various reagents of this type may be used. Particularly useful are reagents selected from the group consisting of organic peracids and chromate oxidizing agents, for example, perbenzoic acid, perphthalic acid or sodium chromate, to give 14α,15α-epoxide compounds of the following formula

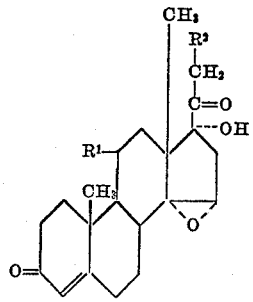

These epoxide compounds are then treated to open up the epoxide ring. This may be done by means of (1) a hydrogen halide, for example hydrogen chloride or hydrogen bromide, in an organic solvent, or (2) water containing as a catalyst a non-nucleophilic strong acid, for example perchloric acid or trichloracetic acid. The term "non-nucleophilic acid" is used herein in its customary sense, i.e. to describe an acid the anion of which does not attack centers possessing positive charges. (See Ingold, Chem. Rev. 15, 266 (1934).) By these means there are obtained compounds in which the epoxide ring has been opened up to give a hydroxy group and a halogen, or two hydroxyl groups, substituted in place of the epoxide ring. The following are formulas of representative compounds.

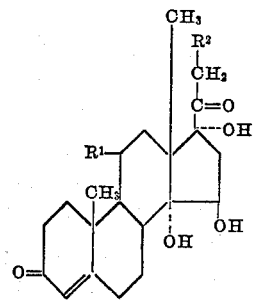

and

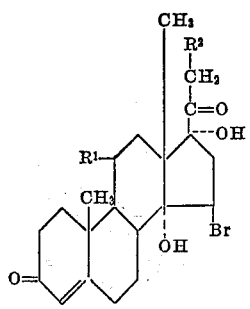

All these products are included in the general formula as given at the beginning of the application.

To summarize, the steps in the syntheses comprise introduction of the double bond at the 14 position, formation of the epoxide ring at the 14α,15α positions, and opening the epoxide ring to give the final products.

It is, of course, apparent that to obtain optimum yields, care must be taken during these reactions to minimize side reactions at other positions in the molecule, for example at the 11 position when it contains an OH group, or at the 21 position when it contains, for instance, an ester group. Considerations such as these influence the choice of the particular reagent, the temperature, pH, solvent, and time of reaction to be used, optimum selections varying somewhat with the particular reaction.

As the 21 position hydroxyl group is the only primary alcohol group present in any of the products, or reactants, it is readily selectively esterified or etherified by standard methods. In general, esters and ethers containing from one to ten carbon atoms in the added moiety are thus formed without difficulty. These include such esters as the formate, acetate, propionate, trimethylacetate, benzoate, hemi-succinate, hemi-phthalate, and cyclohexanecarboxylate, and such ethers as the methyl, ethyl and benzyl. In general, it is more convenient to prepare the heavier esters and ethers directly from the 21-hydroxyl of the product, instead of esterifying or etherifying at the start and carrying the added group through the other step, although this is an alternative, and is sometimes advantageous in the case of the lighter groups, acetate for example.

Each of these products is physiologically active. Many of them have especially marked adrenocortical type activity. Each has either a β-hydroxyl or a keto group at the very important 11 position, and an α-hydroxyl group at the 14 position, which group is also of value.

Particularly noteworthy for their physiological activity are $\Delta^{14}$-dehydrohydrocortisone, 14α,15α-oxido hydrocortisone and 14α-hydroxy-15β-fluoro hydrocortisone, as well as the related 11-ketones, their 21-esters, and the 14α-hydroxy-15β-bromo, chloro and iodo hydrocortisone. By the usual pharmacological tests (mouse thymus, rat thymus and anti-inflammatory) these compounds exhibit thymolytic and anti-inflammatory activity in the range of cortisone and hydrocortisone. Although they are somewhat less active than cortisone and hydrocortisone, it should be stressed that this class of compounds is unique in that they do not cause sodium retention or potassium excretion and do not exhibit any androgenicity-side effects which are common to cortisone and hydrocortisone. Generally the adrenocortically active products are employed at the same dosage levels as is hydrocortisone, although somewhat larger dosages are possible and even desirable, obtaining equivalent potency without unwanted side effects. Topical administration is preferred in many instances, especially for therapy in inflammatory conditions. The usual pharmaceutically acceptable carriers are employed, for instance ointment bases, aqueous suspensions and the like.

The following examples are given solely for the purpose of illustration, and are not to be construed as limitations of this invention, many variations of which are possible without departing from its spirit or scope.

EXAMPLE I

Formation of double bond at 14-position

A solution of p-toluenesulfonic acid in benzene was prepared by taking up 400 mg. of the acid monohydrate in 150 ml. of benzene and boiling off a few milliliters of benzene-water azeotrope. The acid solution was then added to 4 grams of 14α-hydroxyhydrocortisone-21-acetate in 650 ml. of benzene and the mixture heated for 4 hours under reflux in an apparatus containing a moisture trap. A nitrogen atmosphere was maintained throughout the reaction. The resultant solution was shaken vigorously with water, twice with sodium bicarbonate solution, and finally with water. The benzene was removed and the crystalline residue triturated with a small amount of methanol. The product was purified by recrystallization, and found to be 11β,17α,21-trihydroxy-4,14-pregnadien-3,20-dione-21-acetate.

Treatment as described above was applied to 11β,14α,17α-trihydroxy-4-pregnene-3,20-dione. The reaction proceeded as before to yield 11β,17α-dihydroxy-4,14-pregnadien-3,20-dione.

The same reaction was run using 14α,17α-dihydroxy-4-pregnene-3,11,20-trione as the starting material. The product was 17α-hydroxy-4,14-pregnadien-3,11,20-trione.

In the same manner 17α,21-dihydroxy-4,14-pregnadien-3,11,20-trione was prepared from 14α-hydroxycortisone, which is also called 14α,17α,21-trihydroxy-4-pregnene-3,11,20-trione. Here again, standard methods were used to prepare the esters and ethers of the products.

To avoid needless repetition, it should be mentioned here that throughout this and all subsequent examples, in the cases of compounds which have an hydroxyl function on the 21-position, the compound having the free 21-OH group was used as the starting material, and so also were compounds having various ester or ether groups at that 21-position. The overall reaction is the same in all cases, and the 21-position groups remained unchanged throughout. Used groups included formate, acetate, propionate, trimethylacetate, succinate, phthalate and cyclohexanecarboxylate among the esters, and methyl, ethyl and benzyl among the ethers, or, in general, hydrocarbon carboxylic esters and ethers containing from one to ten carbon atoms in the added moiety, all of which are readily formed from the free 21-OH group of the starting steroid. They are also readily formed from the free 21-OH group of the products of each of these examples.

EXAMPLE II

Formation of epoxide

Monoperphthalic acid (7.5 ml. of 0.25 molar ether solution) was added to a solution of 300 mg. of 11β,17α,21 - trihydroxy - 4,14 - pregnadien - 3,20 - dione - 21-acetate in 150 ml. of ethyl acetate. The mixture was stored in the dark for 24 hours. The solution was washed with dilute aqueous sodium bicarbonate and with water, dried over magnesium sulfate and evaporated to dryness. A crude crystalline residue of 11β,17α,21-trihydroxy-14α,15α-epoxido-4-pregnene-3,20-dione-21-acetate remained. After recrystallization from methanol, platelets were recovered.

This experiment was repeated, using perbenzoic acid instead of monoperphthalic acid, and repeated again, this time using aqueous potassium chromate instead of monoperphthalic acid. In each case a product identical with that described immediately above was obtained. Use of an aqueous buffered peracetic acid solution with a solution of the steroid in a water immiscible solvent gave the same results.

Each of these techniques, i.e., the use of monoperphthalic acid, of perbenzoic acid, of potassium chromate, and of peracetic acid, was applied to all the other compounds containing a double bond at the 14-position and obtained as described in Example I. In all cases, the product was the corresponding 14α,15α-epoxide.

EXAMPLE III

Opening the epoxide ring to form halohydrins

A solution of 500 mg. of 11β,17α,21-trihydroxy-14α,15α-epoxido-4-pregnene-3,20-dione-21-acetate in 25 ml. of chloroform was treated at —10° C. with 50 ml. of a saturated solution of anhydrous hydrogen bromide in chloroform. After one hour the chloroform solution was washed with water until neutral, then dried over sodium sulfate and evaporated to dryness. The solid residue was triturated with ether and recrystallized from an ethyl acetate-cyclohexane mixture. The product was 11β,14α,17α,21-tetrahydroxy-15β-bromo-4-pregnene-3,20-dione-21-acetate.

When this experiment was repeated using hydrogen chloride instead of hydrogen bromide the product was the corresponding 11β,14α,17α,21-tetrahydroxy-15β-chloro-4-pregnene-3,20-dione-21-acetate. The corresponding 15β-fluoro and iodo compounds were also prepared by using hydrogen fluoride and hydrogen iodide respectively in lieu of hydrogen bromide.

Each of these reagents was also employed using this technique to treat all the other 14α,15α-epoxides obtained as described in Example II. In each case the product was the corresponding 14α-hydroxy-15β-halo compound.

EXAMPLE IV

Opening the epoxide ring to form 14,15-glycols

11β,17α,21-trihydroxy-14α,15α-epoxido-4-pregnene-3,20-dione was allowed to stand overnight at room temperature in contact with a water-dioxane solution containing a catalytic amount of perchloric acid. 11β,14α,15β,17α,21-pentahydroxy-4-pregnene-3,20-dione was recovered. There were also isolated several other hydroxylated hydrocortisones, among which were compounds whose properties were consistent with their formulation as isomeric glycols, i.e. compounds differing from the above in the configuration at the 14 and/or 15 positions. The mixtures were partially separated by fractional crystallizations, and the individual components were isolated by partition chromatography. The same result was obtained when trichloroacetic acid was used instead of perchloric acid.

In this fashion the epoxide rings of the other compounds made as described in Example II were opened. In all cases the corresponding 14α,15β-glycol was obtained along with other hydroxylated derivatives of the starting material.

PHYSICAL CONSTANTS OF REPRESENTATIVE COMPOUNDS (1) 11β,17α,21-trihydroxy-4,14-pregnadien-3,20-dione-21-acetate M.P. 253°–255° with decomposition
$[\alpha]_D^{dioxane} +116°$
$\epsilon_{242}^{EtOH}$ 16,200

Analysis.—Calcd. for $C_{23}H_{30}O_6$: C, 68.63; H, 7.51. Found: C, 68.47; H, 7.56.

(2) 11β,17α,21-trihydroxy-14α,15α-epoxido-4-pregnene-3,20-dione-21-acetate

M.P. 229°–230°
$[\alpha]_D^{dioxane} +143.0°$
$\epsilon_{240}^{EtOH}$ 16,200

Analysis.—Calcd. for $C_{23}H_{30}O_7$: C, 66.01; H, 7.23. Found: C, 65.68; H, 7.14.

(3) 11β,17α,21-trihydroxy-14α,15α-epoxido-4-pregnene-3,20-dione

M.P. 225°–226.5°
$[\alpha]_D^{dioxane} +159°$
$\epsilon_{239}^{EtOH}$ 16,300
$\lambda_{max}^{KBr}$ 3.0, 5.85, 6.07, 6.20

Analysis.—Calcd. for $C_{21}H_{28}O_6$: C, 67.00; H, 7.50. Found: C, 66.65; H, 7.45.

(4) 17α,21-dihydroxy-4,14-pregnadien-3,11,20-trione-21-acetate

M.P. 200°–201°
$[\alpha]_D^{dioxane} +121.3°$

Analysis.—Calcd. for $C_{23}H_{28}O_6$: C, 68.98; H, 7.05. Found: C, 68.92; H, 6.86.

(5) 17α,21-dihydroxy-14α,15α-epoxido-4-pregnene-3,11,20-trione-21-acetate

M.P. 184°–186°
$[\alpha]_D^{dioxane} +186.2°$
$\epsilon_{237}^{EtOH}$ 16,600

(6) 11β,17α-dihydroxy-4,14-pregnadien-3,20-dione

M.P. 172°–174°
$[\alpha]_D^{dioxane} +90.5°$
$\epsilon_{242}^{EtOH}$ 14,600

These are approximate values; the sample was not an analytical one.

(7) 11β,14α,17α,21-tetrahydroxy-15β-chloro-4-pregnene-3,20-dione-21-acetate

M.P. 172°–174° with decomposition

This is an approximate value; the sample was not an analytical one.

What is claimed is:
1. A compound having the formula

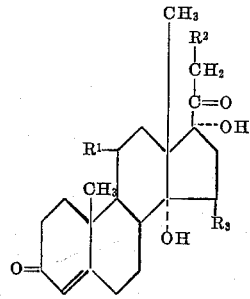

wherein R¹ is selected from the group consisting of β-hydroxyl and keto, R² is selected from the group consisting of H, OH, and esters thereof containing from one to ten carbon atoms in the added moiety, and R³ is selected from the group consisting of OH and the halogens.

2. 11β,14α,17α,21-tetrahydroxy-15β-chloro-4-pregnene-3,20-dione-21-acetate.

3. 11β,14α,15β,17α,21-pentahydroxy-4-pregnene-3,20-dione.

4. 11β,14α,17α,21-tetrahydroxy-15β-fluoro-4-pregnene-3,20-dione-21-acetate.

References Cited in the file of this patent

UNITED STATES PATENTS

| | | |
|---|---|---|
| 2,673,872 | Newman | Mar. 30, 1954 |
| 2,831,001 | Agnelo et al. | Apr. 15, 1958 |
| 2,889,346 | Ringold et al. | June 2, 1959 |